United States Patent
Wegner et al.

(10) Patent No.: US 9,484,575 B2
(45) Date of Patent: *Nov. 1, 2016

(54) CATHODE MATERIAL FOR AN ALKALI-SULFUR CELL

(75) Inventors: Marcus Wegner, Leonberg (DE); Jens Grimminger, Leonberg (DE); Martin Tenzer, Unterensingen (DE); Jean Fanous, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 254 days.

This patent is subject to a terminal disclaimer.

(21) Appl. No.: 14/114,411

(22) PCT Filed: Mar. 7, 2012

(86) PCT No.: PCT/EP2012/053834
§ 371 (c)(1),
(2), (4) Date: Jan. 10, 2014

(87) PCT Pub. No.: WO2012/150060
PCT Pub. Date: Nov. 8, 2012

(65) Prior Publication Data
US 2014/0154589 A1     Jun. 5, 2014

(30) Foreign Application Priority Data
May 2, 2011   (DE) .................. 10 2011 075 051

(51) Int. Cl.
*H01M 6/16* (2006.01)
*H01M 4/13* (2010.01)
(Continued)

(52) U.S. Cl.
CPC ........... *H01M 4/364* (2013.01); *H01M 4/1399* (2013.01); *H01M 4/602* (2013.01); *H01M 10/052* (2013.01); *H01M 10/39* (2013.01); *H01M 4/137* (2013.01); *Y02E 60/122* (2013.01)

(58) Field of Classification Search
CPC .. H01M 4/364; H01M 4/137; H01M 4/0404; H01M 4/625; H01M 4/1399
USPC ....... 429/332, 213, 335, 337, 338, 341, 342; 525/354
See application file for complete search history.

(56) References Cited

U.S. PATENT DOCUMENTS

| 5,601,947 A | 2/1997 | Skotheim et al. |
| 6,652,440 B1 | 11/2003 | Kovalev et al. |

(Continued)

FOREIGN PATENT DOCUMENTS

| JP | 3-139502 | 6/1991 |
| JP | 11-329413 | 11/1999 |

(Continued)

OTHER PUBLICATIONS

Yu, X, et al., ""Lithium Storage in Conductive Sulfur-Containing Polymers", Journal of Electroanalytical Chemistry", Bd. 573, Nr. 1, Nov. 15, 2004, pp. 121-128.*

(Continued)

*Primary Examiner* — William Cheung
(74) *Attorney, Agent, or Firm* — Norton Rose Fulbright US LLP

(57) ABSTRACT

In a method for preparing a cathode material for an alkali-sulfur cell, e.g., a lithium-sulfur cell, at least one polyacrilonitrile-sulfur composite material and elemental sulfur are mixed, in order to increase the voltage, the capacitance and the energy density.

12 Claims, 1 Drawing Sheet

(51) Int. Cl.
  *H01M 6/04* (2006.01)
  *C08C 19/20* (2006.01)
  *H01M 4/36* (2006.01)
  *H01M 4/1399* (2010.01)
  *H01M 4/60* (2006.01)
  *H01M 10/052* (2010.01)
  *H01M 10/39* (2006.01)
  *H01M 4/137* (2010.01)

(56) References Cited

U.S. PATENT DOCUMENTS

| | | |
|---|---|---|
| 2002/0039680 A1 | 4/2002 | Hwang et al. |
| 2002/0061441 A1 | 5/2002 | Ogura et al. |
| 2002/0187398 A1 | 12/2002 | Mikhaylik et al. |
| 2005/0175904 A1 | 8/2005 | Gorkovenko |
| 2012/0059085 A1 | 3/2012 | He et al. |

FOREIGN PATENT DOCUMENTS

| | | |
|---|---|---|
| JP | 11-514128 | 11/1999 |
| JP | 2002-110237 | 4/2002 |
| JP | 2004-527068 | 9/2004 |
| JP | 2007-522638 | 8/2007 |
| WO | WO 2010/044437 | 4/2010 |
| WO | WO 2011/148357 | 12/2011 |

OTHER PUBLICATIONS

International Search Report for PCT/EP2012/053834, dated May 9, 2012.
Wang, et al., "Sulfur Composite Cathode Materials for Rechargeable Lithium Batteries", Advanced Functional Materials, Wiley VC H. Verlag GmbH & Co., Bd. 13, No. 6, Jun. 1, 2003, pp. 487-492.
Nazar et al., "Nature Materials", vol. 8, Jun. 2009, pp. 500-506.
Wang et al., "Advanced Materials", 14, 2002, No. 13-14, pp. 963-965.
Yu et al., "Journal of Power Sources", 146, 2005, pp. 335-339.

* cited by examiner

CATHODE MATERIAL FOR AN ALKALI-SULFUR CELL

BACKGROUND OF THE INVENTION

1. Field of the Invention

The present invention relates to a method for preparing a cathode material for an alkali-sulfur cell, an alkali-sulfur cell or rather battery and an energy store.

2. Description of the Related Art

In order to produce batteries having a clearly greater energy density, in lithium-sulfur battery technology, at this time, (in brief: Li/S) is being researched. If the cathode of a lithium-sulfur cell consisted completely of elemental sulfur, in theory, an energy content of more than 1,000 Wh/kg could be achieved. However, sulfur is neither ionically nor electrically conductive, so that additives have to be added to the cathode which clearly lower the theoretical value. In addition, during the discharge of a lithium-sulfur cell, elemental sulfur is usually reduced to soluble polysulfides $S_x^{2-}$. These are able to diffuse into regions such as the anode region, in which they are no longer able to participate in the electrochemical reaction of the subsequent charge/discharge cycles. In addition, polysulfides may be dissolved in the electrolyte which are not able to be reduced further. Therefore, in practice at this time, sulfur utilization, and, with that, the energy density of lithium-sulfur cells is clearly lower, and is estimated to be between 400 Wh/kg and 600 Wh/kg.

Various concepts exist for raising the sulfur utilization. Nazar et al. describe in Nature Materials, vol. 8, June 2009, 500-506, that carbon tubules favor retention of polysulfides in the cathode space and at the same time take care of sufficient conductivity.

Wang et al. describe in Advanced Materials, 14, 2002, No. 13-14, pp. 963-965 and Advanced Functional Materials, 13, 2003, No. 6, pp. 487-492, and Yu et al. describe in Journal of Electroanalytical Chemistry, 573, 2004, 121-128 and Journal of Power Sources, 146, 2005, 335-339 another technology in which polyacrylonitrile (abb.: PAN) is heated with an excess of elemental sulfur, the sulfur, on the one hand, being cyclized to form a polymer having a conjugated n-system while forming $H_{2S}$ polyacrylonitrile, and on the other hand, being bound in the cyclized matrix.

BRIEF SUMMARY OF THE INVENTION

The subject matter of the present invention is a method for preparing a cathode material for an alkali-sulfur cell, particularly a lithium-sulfur cell, which includes the method step of:

a) mixing at least one polyacrylonitrile-sulfur composite material and elemental sulfur having covalent sulfur-carbon bonds.

By a polyacrylonitrile-sulfur composite material one may particularly understand a composite material which is produced by reacting polyacrylonitrile with sulfur.

The sulfur atoms may be connected in the polyacrylonitrile-sulfur composite material both directly, by covalent sulfur-carbon bonds, and indirectly by one or more covalent sulfur-sulfur bonds and one or more sulfur-carbon bonds to the cyclized polyacrylonitrile skeleton.

In this context, at least a part of the sulfur atoms of the polyacrylonitrile-sulfur composite material, for instance in the form of polysulfide chains, may be covalently connected with a cyclized polyacrylonitrile strand.

Alternatively or in addition, a part of the sulfur atoms of the polyacrylonitrile-sulfur composite material, for example in the form of polysulfide chains, may be connected on both sides intramolecularly to a cyclized polyacrylonitrile strand, especially while forming a S-heterocycle condensed with the cyclized polyacrylonitrile strand, and/or intermolecularly with two cyclized polyacrylonitrile strands, especially while forming a cross-link, particularly a polysulfide cross-link between the cyclized polyacrylonitrile strands.

By the admixture of elemental sulfur, the average voltage, which in the case of polyacrylonitrile-sulfur composite materials is usually approximately 1.85 V may advantageously be increased to about 2.05 V. At the same capacitance, this advantageously means an increase in the energy density of more than 10%.

In addition, because of the cathode material according to the present invention, especially because of an improved sulfur utilization, the system may have a higher capacitance and cycle stability. For, an improvement in sulfur utilization may be achieved, for one thing, in that the polyacrylonitrile-sulfur composite material has a conductive surface, which is able to be used for the reduction of the elemental sulfur, which is not present in the initial state bound covalently or unbound in the cathode material. For another thing, because of the polyacrylonitrile-sulfur composite material, a migration of polysulfides created in the reduction of the elemental sulfur, into the anode region, for example, may be inhibited in that the covalently bound sulfur of the polyacrylonitrile-sulfur composite material reacts with the polysulfides and binds them covalently. In this instance, the polysulfide anions may open sulfur cross-links in the polyacrylonitrile-sulfur composite material, in each case two polysulfide anions being created, which are bound covalently at one end of the chain to the cyclized polyacrylonitrile skeleton. In the following reduction, such polysulfide chains may successively be built up. Since these polysulfide chains are covalently bound to the cyclized polyacrylonitrile skeleton, they also are no longer able to be dissolved detached by the electrolyte. Thus, in this way, the sulfur utilization, and consequently the voltage and the capacitance as well as the cycle stability may advantageously be raised.

DETAILED DESCRIPTION OF THE INVENTION

Figure 1:
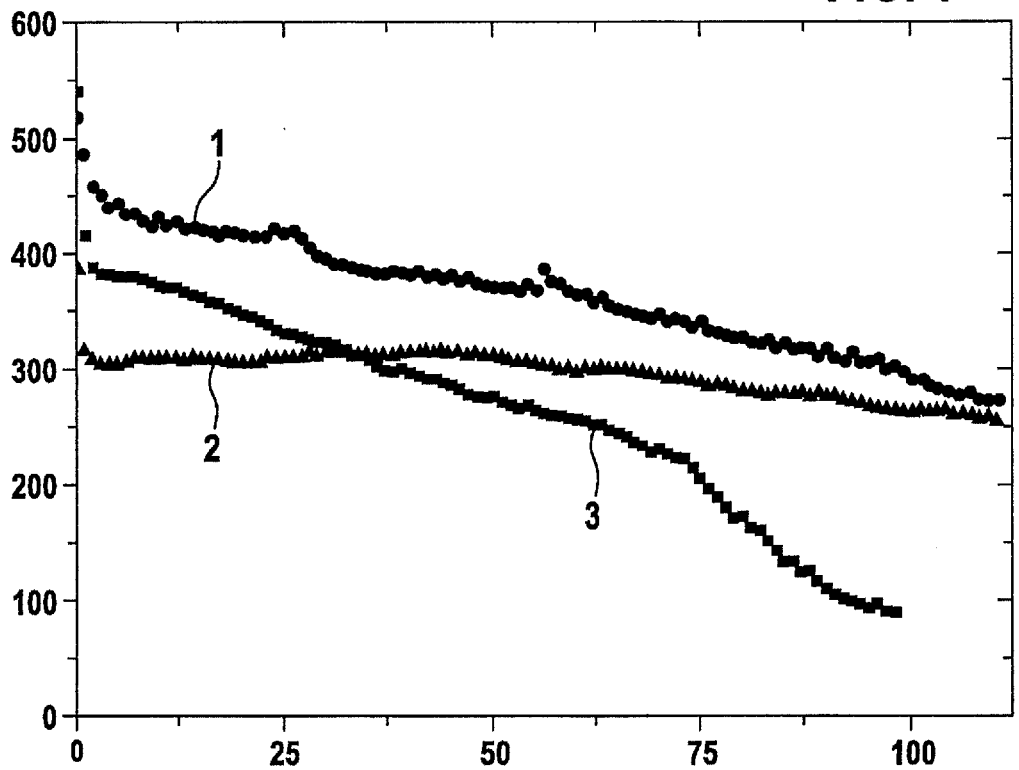
FIG. 1 shows a graph in which the specific capacitance, with reference the sulfur weight of the cathode, is plotted of one specific embodiment of a cathode material according to the present invention, of elemental sulfur as such, as well as of a polyacrilonitrile-sulfur composite material as such against the cycle number.

According to Yu et al. (Journal of Electroanalytical Chemistry, 573, 2004, 121-128 and Jounal of Power Sources, 146, 2005, 335-339), a polyacrylonitrile-sulfur composite material having covalent sulfur-carbon bonds is able to be prepared by an, in particular, one-stage reaction of polyacrylonitrile with elemental sulfur at a temperature of ≥300° C.

Therefore, within the scope of a first specific embodiment, in method step a) a polyacrylonitrile-sulfur composite material having covalent sulfur-carbon bonds is used, which is prepared by a particularly one-stage reaction of polyacrylonitrile with sulfur, especially elemental sulfur, at a temperature of ≥300° C., particularly ≥330° C., for example, ≥350° C. or ≥400° C. or ≥450° C. The reaction may take place, in this context, particularly in an inert gas atmosphere, such as in an argon or nitrogen atmosphere.

Investigation has shown that a polyacrylonitrile-sulfur composite material having covalent sulfur-carbon bonds may even be prepared at lower temperatures than 300° C., for instance, in a single stage, a two-stage or a multi-stage synthesis, in the presence of a catalyst and/or by an at least two-stage method, in that, in a first method step, polyacrylonitrile is converted to cyclized polyacrylonitrile, the cyclized polyacrylonitrile, in a second method step, being reacted with sulfur to form polyacrylonitrile-sulfur composite material having covalent sulfur-carbon bonds.

Therefore, within the scope of a second specific embodiment, in method step a), a polyacrylonitrile-sulfur composite material having covalent sulfur-carbon bonds is used, which is prepared by reacting polyacrylonitrile with sulfur, for instance, in a one-step, two-step or multi-step synthesis, in the presence of a catalyst.

The reaction temperature as well as the reaction time are advantageously able to be reduced by the addition of a catalyst. By the lowering of the reaction temperature, in addition, the chain length of the polysulfides, that are covalently bonded to the cyclized polyacrylonitrile, may be increased. The reason for this is that elemental sulfur is present at room temperature in the form of $S_{8\ rings}$. At temperatures above room temperature, the sulfur is present in the form of $S_X$ chains of medium chain length, for instance, from 6 to 26 sulfur atoms, or greater chain length, such as $10^3$ to $10^6$ sulfur atoms. Above 187° C., a thermal cracking process starts, and the chain length comes down again. Beginning at 444.6° C. (the boiling point) gaseous sulfur is present at a chain length of 1-8 atoms. The use of a vulcanization catalyst has the advantage, in this instance, that, at a lower temperature, longer intermolecular and/or intramolecular cross-links bound covalently to, in particular, cyclized polyacrylonitrile are able to be introduced into the polyacrylonitrile-sulfur composite material. In turn, advantageously, a higher sulfur content of the polyacrylonitrile-sulfur composite material, and thus a higher capacitance and energy density of the alkali-sulfur cell, particularly a lithium-sulfur cell, to be equipped with the cathode material may be achieved. To be sure, this may lead to a reduction in the cycle stability, which may be compensated for, however, by the selection of a suitable electrolyte.

Therefore, within the scope of one embodiment, in method step a), a polyacrylonitrile-sulfur composite material having covalent sulfur-carbon bonds is used, which has polysulfide chains bound covalently to a polyacrylonitrile skeleton, having a chain length of 2 sulfur atoms, particularly ≥3 or ≥4 or ≥5 or ≥6 or ≥7 or ≥8 or ≥9 or ≥10 sulfur atoms.

Within the scope of the second specific embodiment, suitable catalysts are known from the technical field of rubber vulcanization. The reaction is therefore preferably carried out at least from time to time in the presence of a vulcanization catalyst or a vulcanization accelerator. In particular, the vulcanization catalyst or vulcanization accelerator may include at least one sulfide radical starter or be made of it. The sulfide radical starter may particularly be selected from the group made up of sulfide metal complexes, such as may be obtained by the reaction of zinc oxide (ZnO) and tetramethylthiuramide disulfide or N,N-dimethylthiocarbamate, sulfenamides, such as 2-mercaptobenzothiazoylamine derivatives, and combinations thereof. The reaction mixture may include, for example, ≥3 wt.-% to ≤5 wt.-% zinc oxide and possibly ≥0.5 wt.-% to ≤1 wt.-% tetramethylthiuramide disulfide. In order to lower the reaction speed or to end a reaction phase having a reaction speed that is increased, for example, by the catalyst, the reaction may be carried out at least from time to time in the presence of a vulcanization inhibitor. Vulcanization inhibitors suitable for this are also known from the technical field of rubber vulcanization. For example, N-(cyclohexylthio)phthalamide may be used as a vulcanization inhibitor. Because of using, and the duration of using catalysts, particularly the vulcanization catalyst or vulcanization accelerator and/or vulcanization inhibitor, the properties of the polyacrylonitrile-sulfur composite materials are able to be set specifically. The reaction may take place, in this context, from time to time or completely in an inert gas atmosphere, such as in an argon or nitrogen atmosphere. The reaction may be carried out, in this context, in less than 12 h, particularly less than 8 h, for instance, in 5 h to 7 h, for example, in about 6 h. The reaction may take place from time to time or completely at a temperature in the range of ≥120° C. to ≤380° C., particularly of ≥150° C. to ≤350° C., for example of ≥180° C. to ≤330° C., for example. In particular, during the reaction, first a first temperature may be set, for instance, in a range of ≥250° C. to ≤600° C., particularly of ≥300° C. to ≤500° C., for example of ≥330° C. to ≤450° C., and then a second temperature may be set, which is lower than the first temperature, such as in the range of ≥120° C. to ≤250° C., particularly of ≥150° C. to ≤250° C., for example of ≥180° C. to ≤200° C. In this context, the phase within which the second temperature is set, may in particular be longer than the phase in which the first temperature is set. By the first temperature phase, a cyclization of the polyacrylonitrile may be effected. During the second temperature phase, essentially the development may take place of covalent sulfur-carbon bonds. In this case, because a lower temperature is set, as was explained before, longer polysulfide chains may be linked to the cyclized polyacrylonitrile skeleton. The reaction preferably takes place, in this case, at a temperature of <300° C. If necessary, the catalyst and perhaps the inhibitor are removed partially or completely in a removal step.

Within the scope of a third specific embodiment, in method step a), a polyacrilonitrile-sulfur composite material having covalent sulfur-carbon bonds is used, which is prepared by a method in which, in a first method step, polyacrilonitrile is converted to cyclized polyacrilonitrile, and in a second method step, the cyclized polyacrilonitrile is converted to a polyacrilonitrile-sulfur composite material having covalent sulfur-carbon bonds.

In the first method step, in this instance, first an electrically conductive basis in the form of the electrically conductive, cyclized polyacrilonitrile (ScPAN) may be formed, for example. In the second method step, the reaction with the electrochemically active sulfur is able to take place, in particular, the latter being bound covalently to the electrically conductive skeleton of cyclized polyacrilonitrile, while there is formation of polyacrilonitrile-sulfur composite material (ScPAN). By separation into two partial reactions, the reaction conditions may advantageously be optimized to the respective reaction.

The first method step, in this context, is similar to a dehydrogenation reaction known from the preparation of carbon fiber, the second method step being similar to a reaction from an additional field that is quite different, namely the vulcanization reaction of rubber.

Within the scope of a third specific embodiment, a polyacrilonitrile-sulfur composite material having a specified structure is able to be prepared, which may be used as cathode material for alkali-sulfur cells, especially lithium-sulfur cells, particularly in order to achieve a good long-term stability or an electrochemical cycle stability. In particular, a polyacrilonitrile-sulfur composite material thus prepared, by contrast to the polyacrilonitrile-sulfur composite materials prepared according to Yu et al., may have less or essentially no thioamide unit (S=CR(NR'R''), particularly S=CR(NHR')).

Within the scope of another embodiment, in method step a), therefore, a polyacrilonitrile-sulfur composite material having covalent sulfur-carbon bonds, whose proportion of sulfur atoms bound in a thioamide unit, in relation to the total number of sulfur atoms in the polyacrilonitrile-sulfur composite material amounts to ≤25 atom-percent, particularly ≤20 atom-percent or ≤15 atom-percent, for instance, ≤10 atom-percent. In thioamide units the sulfur already has an oxidation number of −2, and in response to its use in a cathode of an alkali-sulfur cell, particularly a lithium-sulfur cell, it cannot in theory be further reduced. Consequently, the sulfur of thioamide units lowers the theoretical sulfur utilization of the cathode material. In the method according to the present invention, because the creation of thioamide units is able to be reduced or even prevented, the polyacrilonitrile-sulfur composite material prepared in this way advantageously has a better sulfur utilization.

Within the scope of the third specific embodiment, the first method step is able to take place particularly in an oxygen-containing atmosphere, for example, an air atmosphere or an oxygen atmosphere. For example, the first method step may take place at a temperature in the range of ≥150° to ≤500° C., particularly of ≥150° C. to ≤330° C. or ≥300° C. or ≤280° C., for example, of ≥230° C. to ≤270° C. The reaction time of the first method step may advantageously amount to less than 3 h, particularly less than 2 h, for example, less than 1 h. The first method step may take place particularly in the presence of a cyclizing catalyst. Catalysts known from carbon fiber preparation may be used, for example, as cyclizing catalysts. The reaction temperature and/or the reaction time of the first method step are advantageously able to be reduced by the addition of a cyclizing catalyst. In the first method step, the reaction mixture is preferably mixed occasionally or continuously. The second method step may take place particularly in an inert gas atmosphere, such as in an argon or nitrogen atmosphere. The reaction time of the second method step may advantageously amount to less than 8 h, for example less than 1 h to 7 h, for example, less than 3 h. The second method step of the third specific embodiment is preferably carried out at least from time to time in the presence of a vulcanization catalyst, explained within the scope of the second specific embodiment, or in the presence of a vulcanization accelerator and/or vulcanization inhibitor.

Within the scope of the first, second and third specific embodiment, it is basically possible to add both elemental sulfur and a sulfur compound, particularly one which reacts with, particularly cyclized polyacrilonitrile, while forming a covalent sulfur-carbon bond. However, within the scope of the first, second and third specific embodiment, elemental sulfur, particularly sublimed elemental sulfur is added. Elemental sulfur, particularly sublimed elemental sulfur, is advantageously cost-effective and comparatively simple to handle.

Within the scope of the first, second and third specific embodiment, sulfur is preferably used in excess. Within the scope of the first, second and third specific embodiment, for example, the weight ratio of sulfur to, particularly cyclized polyacrilonitrile may amount to ≥1:1, particularly ≥1.5:1, for example ≥2:1, for example ≥3:1, and/or ≤20:1, particularly ≤15:1 or ≤10:1, for example ≤5:1 or ≤3:1 or ≤2,5:1 or ≤2:1. The elemental sulfur used in excess during the preparation may remain in the composite material, or it may be removed, depending on the process guidance, for instance, by sublimation at high reaction temperatures and/or by a removal step, for instance, by extraction, such as Soxhlet extraction, particularly using a nonpolar solvent or solvent mixture, such as toluol.

Therefore, conditioned upon the preparation, the polyacrilonitrile-sulfur composite material may itself include elemental sulfur. The latter, in particular not covalently bound elemental sulfur in the polyacrilonitrile-sulfur composite material preparation remaining or excessive in the polyacrilonitrile-sulfur composite material should not be understood to be the elemental sulfur used in method step a). In other words, provided the polyacrilonitrile-sulfur composite material itself includes elemental sulfur, one should understand by the elemental sulfur, used in method step a), additionally added elemental sulfur.

Within the scope of another specific embodiment, the method furthermore includes method step b): Admixing at least one electrically conductive additive, especially selected from the group made up of soot, graphite, carbon fibers, carbon nanotubes and mixtures thereof. In this context, method step b) may take place before method step a), simultaneously with it or after it. The electrically conductive additive may, for instance, be mixed with the composite material, the elemental sulfur being admixed subsequently. Or, in reverse, the electrically conductive additive may first be mixed with the elemental sulfur, the composite material being subsequently admixed. In particular, the electrically conductive additive may be admixed to a mixture of composite material and elemental sulfur.

Within the scope of another specific embodiment, the method furthermore includes method step c): Admixing at least one binding agent, for instance, polyvinylidene fluoride (PVDF) and/or polytetrafluoroethylene (PTFE). In this context, method step c) may take place before method step a) and/or b), partially simultaneously with them or after them. The binding agent may, for instance, be mixed first with the composite material, the elemental sulfur being admixed subsequently. Or, in reverse, the binding agent may first be mixed with the elemental sulfur, the composite material being subsequently admixed. Or, the binding agent may first be mixed with the electrically conductive additive, for example, the resulting mixture subsequently being admixed to the mixture of composite material and elemental sulfur, etc. In particular, the binding agent may be admixed to a mixture of composite material and elemental sulfur and perhaps electrically conductive additive.

Within the scope of an additional specific embodiment, in method step a), particularly ≥10 wt.-% to ≤90 wt.-%, for example ≥10 wt.-% to ≤30 wt.-%, of polyacrilonitrile-sulfur composite material and ≥5 wt.-% to ≤60 wt.-%, for example ≥30 wt.-% to ≤60 wt.-%, of elemental sulfur are mixed.

Within the scope of a further specific embodiment, in method step b) ≥0.1 wt.-% to ≤30 wt.-%, for example ≥5 wt.-% to ≤20 wt.-%, of electrically conductive additives are admixed.

Within the scope of a still further specific embodiment, in method step c) ≥0.1 wt.-% to ≤30 wt.-%, for example ≥5 wt.-% to ≤20 wt.-%, of binding agent are admixed.

The sum of the weight-percentage values of polyacrilonitrile-sulfur composite material, elemental sulfur, electrically conductive additives and binding agents may add up to a total of 100 wt.-%, in this context.

Within the scope of an additional specific embodiment, in method step a) as much elemental sulfur is used so that the sulfur proportion of the polyacrilonitrile-sulfur composite material and of the, particularly admixed elemental sulfur, in total, amounts to ≥30 Gew.-%, particularly ≥50 Gew.-%, for example ≥60 Gew.-%, with reference to the total weight of the cathode material.

The cathode material may include, particularly in the form of a cathode material slurry, for preparing a cathode, furthermore at least one solvent, such as N-methyl-2-pyrrolidone. Such a cathode material slurry may be applied, for instance by a doctor blade, to a carrier material such as an aluminum plate or foil. The solvents are preferably removed again after the application of the cathode material and before assembly of the lithium-sulfur cell, preferably completely by a drying method.

The cathode material carrier material system may be subdivided subsequently to form several cathode material carrier material units, by stamping or cutting.

The cathode material carrier material system or the cathode material carrier material units are able to be installed with a lithium metal anode, the latter in the form of a plate or foil, to form a lithium-sulfur cell.

In this instance, an electrolyte may be added that will be explained below.

A further subject matter of the present invention is a cathode material for an alkali-sulfur cell, particularly for a lithium-sulfur cell, which is prepared according to a method according to the present invention.

A further subject matter of the present invention is an alkali-sulfur cell or an alkali-sulfur battery having an alkali-containing, particularly a lithium-containing anode and a cathode, the cathode including a cathode material according to the present invention.

In this context, the anode may particularly be an alkali metal anode, especially a lithium metal anode, for example, in the form of a plate or foil, made, for instance, of metallic lithium.

Within the scope of one further specific embodiment, the alkali-sulfur cell or the alkali-sulfur battery includes an electrolyte particularly of at least one electrolytic solution agent and at least one conducting salt.

The electrolytic solution agent may basically be selected from the group made up of carbonic acid esters, particularly cyclic or acyclic carbonates, lactones, ethers, particularly cyclic or acyclic ethers and combinations thereof. The electrolytic solution agent may include diethyl carbonate (DEC), dimethyl carbonate (DMC), propylene carbonate (PC), ethylene carbonate (EC), 1,3-dioxolane (DOL), 1,2-dimethoxyethane (DME) or a combination thereof, or it may be made thereof. The conducting salt may be selected, for example, from the group made up of lithium hexafluorophosphate ($LiPF_6$), lithium bis(trifluoromethylsulfonyl)imide (LiTFSI), lithium tetrafluoroborate ($LiBF_4$), lithium trifluoromethanesulfonate ($LiCF_3SO_3$), lithium chlorate ($LiClO_4$), lithium bis(oxalato)borate (LiBOB), lithium fluoride (LiF), lithium nitrate ($LiNO_3$), lithium hexafluoroarsenate ($LiAsF_6$ and combinations thereof.

Within the scope of an additional specific embodiment, the electrolytic solution agent is selected from the group made up of cyclic ethers, acyclic ethers and combinations thereof, and/or includes or is the conducting salt lithium bis(trifluoromethylsulfonyl)imide (LiTFSI). This electrolytic solution agent or rather this conducting salt have proven advantageous for cathode materials according to the present invention, particularly in order to avoid reactions between the elemental sulfur and the electrolyte.

One additional subject matter of the present invention is an energy store, particularly a mobile or stationary energy store, which includes an alkali-sulfur cell or an alkali-sulfur battery according to the present invention, particularly a lithium-sulfur cell or a lithium-sulfur battery. The energy store may, for instance, be an energy store for a vehicle, such as an electric or a hybrid vehicle or an electric tool or electric unit, for instance, a screwdriver or a garden device, or an electronic unit, such as a portable computer and/or a telecommunications unit, such as a mobile phone, PDA or a high energy storage system for a home or a plant. Since the alkali-sulfur cells or alkali-sulfur batteries have a very high energy density, they are particularly suitable for vehicles and stationary storage systems, such as high energy storage systems for homes or plants.

EXAMPLES

Example 1

Synthesis According to Yu et al.

elemental sulfur and polyacrilonitrile were mixed and reacted in an argon atmosphere at 300° C. to form a polyacrilonitrile-sulfur composite material. The resulting polyacrilonitrile-sulfur composite material contained both covalently bound and unbound sulfur. The sulfur proportion of bound and unbound sulfur amounted in sum to 42 wt.-% with reference to the total weight of the polyacrilonitrile-sulfur composite material.

Example 2

70 wt.-% polyacrilonitrile-sulfur composite material from example 1 were processed with a solvent, 15 wt.-% soot and 15 wt.-% binding agent to form a cathode material slurry.

Example 3

70 wt.-% of elemental sulfur were processed with a solvent, 15 wt.-% soot and 15 wt.-% binding agent to form a cathode material slurry.

Example 4a 17.24 wt.-% of polyacrilonitrile-sulfur composite material from example 1 were processed with 52.76 wt.-% elemental sulfur, 15 wt.-% binding agent and a solvent, to form a cathode material slurry. Since the polyacrilonitrile-sulfur composite material contained a total of 42 wt.-% sulfur, which in the case of 17.24 wt.-% polyacrilonitrile-sulfur composite material corresponds to 7.24 wt.-% of the mixture to be prepared, the total sulfur proportion of the mixture (the sum of the sulfur proportion of the composite material of 7.24 wt.-% and of the elemental sulfur of 52.76 wt.-%) was approximately 60 wt.-% with reference to the total weight of the mixture.

Example 4b 34.48 wt.-% of polyacrilonitrile-sulfur composite material from example 1 were processed with 35.52 wt.-% elemental sulfur, 15 wt.-% soot, 15 wt5.-% binding agent and a solvent, to form a cathode material slurry. Since the polyacrilonitrile-sulfur composite material contained a total of 42 wt.-% sulfur, which in the case of 34.48 wt.-% polyacrilonitrile-sulfur composite material corresponds to 14.48 wt.-% of the mixture to be prepared, the total sulfur proportion of the mixture (the sum of the sulfur proportion of the composite material of 14.48 wt.-% and of the elemental sulfur of 35.52 wt.-%) was approximately 50 wt.-% with reference to the total weight of the mixture.

The cathode slurries of Examples 2, 3 and 4a were each doctored onto an aluminum foil and the resulting layer was dried. Subsequently, cathodes were stamped out of the cathode material carrier material systems and installed with a lithium anode to form a lithium-sulfur cell. In the case of Example 2, as the electrolyte, $LiPF_6$ in ethylene carbonate (EC): diethyl carbonate (DEC):dimethyl carbonate(DMC) (2:2:1) was used, and in the case of Examples 3 and 4a, LiTFSI in dioxolane(DOL):dimethyl carbonate(DME) (1:1) was used. The cells thus produced were measured.

FIG. 1 shows that cathode material 1 of Example 4a has both a higher specific capacitance, with reference to the sulfur weight of the cathode, than cathode material 2 based on elemental sulfur as such of Example 3 than also cathode material 3 based on the polyacrilonitrile-sulfur composite material as such of Example 2.

In addition, FIG. 1 shows that cathode material 1 of Example 4a has a better cycle stability than cathode material 3 based on polyacrilonitrile-sulfur composite material as such of Example 2, and a similar cycle stability to cathode material 2 based on elemental sulfur as such of Example 3.

Figure 2:
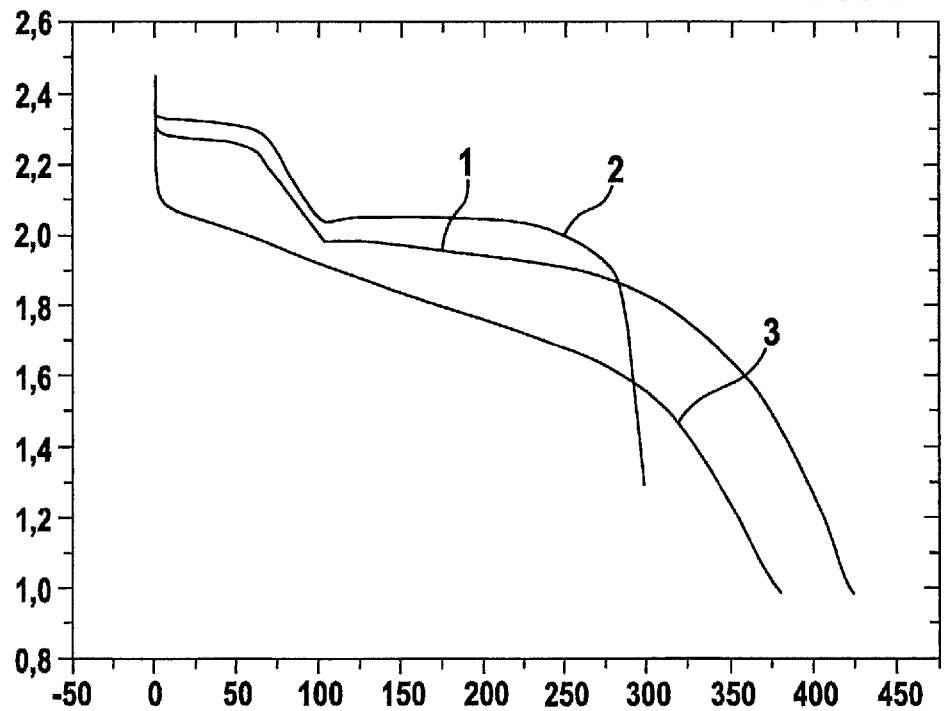
FIG. 2 shows a graph in which, for the specific embodiment shown in FIG. 1 of a cathode material according to the present invention, for elemental sulfur as such, as well as for a polyacrilonitrile-sulfur composite material as such, the voltage is plotted against the specific capacitance, with reference to the sulfur weight of the cathode.

FIG. 2 shows that cathode material 1 of Example 4a has a higher energy density than cathode material 2 based on elemental sulfur as such of Example 3 and than cathode material 3 based on the polyacrilonitrile-sulfur composite material as such of Example 2.

FIGS. 1 and 2 show that, by the combination of a polyacrilonitrile-sulfur composite material with elemental sulfur, a synergystic effect and altogether a higher voltage, capacitance and energy density are able to be achieved.

What is claimed is:

1. A method for preparing a cathode material for an alkali-sulfur cell, the method comprising:
    a) mixing (1) at least one polyacrilonitrile-sulfur composite material that includes covalent sulfur-carbon bonds with (2) elemental sulfur;
    wherein the polyacrilonitrile-sulfur composite material is prepared by a reaction of polyacrilonitrile with sulfur in the presence of a catalyst.

2. The method as recited in claim 1, wherein the polyacrilonitrile-sulfur composite material is prepared by a reaction of polyacrilonitrile with sulfur at a temperature of ≥300° C.

3. A method for preparing a cathode material for an alkali-sulfur cell, the method comprising:
    a) mixing (1) at least one polyacrilonitrile-sulfur composite material that includes covalent sulfur-carbon bonds with (2) elemental sulfur;
    wherein the polyacrilonitrile-sulfur composite material includes polysulfide chains bound covalently to a polyacrilonitrile skeleton, having a chain length of at least three sulfur atoms.

4. The method as recited in claim 1, wherein the polyacrilonitrile-sulfur composite material is prepared by a method in which, in a first step, polyacrilonitrile is converted to cyclized polyacrilonitrile, and in a second step, the cyclized polyacrilonitrile is converted with sulfur to a polyacrilonitrile-sulfur composite material having the covalent sulfur-carbon bonds.

5. A method for preparing a cathode material for an alkali-sulfur cell, the method comprising:
    a) mixing (1) at least one polyacrilonitrile-sulfur composite material that includes covalent sulfur-carbon bonds with (2) elemental sulfur;
    wherein the polyacrilonitrile-sulfur composite material includes sulfur atoms bound in a thioamide unit at a proportion of ≤25 atom-percent in relation to the total number of sulfur atoms in the polyacrilonitrile-sulfur composite material.

6. A method for preparing a cathode material for an alkali-sulfur cell, the method comprising:
    a) mixing (1) at least one polyacrilonitrile-sulfur composite material that includes covalent sulfur-carbon bonds with (2) elemental sulfur; and
    b) admixing an electrically conductive additive including at least one of soot, graphite, carbon fibers, and carbon nanotubes.

7. The method as recited in claim 6, further comprising:
    c) admixing a binding agent including at least one of polyvinylidene fluoride and polytetrafluoroethylene.

8. The method as recited in claim 7, wherein at least one of:
    in method step a), ≥10 wt.-% to ≤30 wt.-% of polyacrilonitrile-sulfur composite material and ≥30 wt.-% to ≤60 wt.-% of elemental sulfur are mixed;
    in method step b), ≥5 wt.-% to ≤20 wt.-% of the electrically conductive additive is admixed; and
    in method step c), ≥5 wt.-% to ≤20 wt.-% of the binding agent is admixed.

9. The method as recited in claim 7, wherein the amount of elemental sulfur used in method step a) is selected such that the sulfur proportion of the polyacrilonitrile-sulfur composite material and of the elemental sulfur, in total, amounts to ≥50 Gew.-% with reference to the total weight of the cathode material.

10. A cathode material for an alkali-sulfur cell, wherein the cathode material is prepared by mixing (a) at least one polyacrilonitrile-sulfur composite material that includes covalent sulfur-carbon bonds with (b) elemental sulfur.

11. An alkali-sulfur cell, comprising:
    an alkali-containing anode and a cathode;
    wherein the cathode includes a cathode material prepared by mixing (a) at least one polyacrilonitrile-sulfur composite material that includes covalent sulfur-carbon bonds with (b) elemental sulfur, and
    wherein the alkali-sulfur cell includes an electrolyte made up of at least one electrolytic solution agent and at least one conducting salt, and wherein at least one of: (i) the electrolytic solution agent includes at least one of cyclic ethers and acyclic ethers; and (ii) the conducting salt includes lithium bis(trifluoromethylsulfonyl)imide.

12. The alkali-sulfur cell as recited in claim 11, wherein the alkali-sulfur cell is part of an energy store.

* * * * *